United States Patent [19]
Reeves

[11] Patent Number: 6,053,285
[45] Date of Patent: Apr. 25, 2000

[54] APPARATUS FOR DISPENSING MEASURED QUANTITIES OF LUBRICANT

[75] Inventor: Gordon P. Reeves, Grandville, Mich.

[73] Assignee: G.P. Reeves, Inc., Holland, Mich.

[21] Appl. No.: 09/007,226

[22] Filed: Jan. 14, 1998

[51] Int. Cl.⁷ .............................. F01M 11/08; F16N 27/00
[52] U.S. Cl. .......................... 184/6.23; 184/6.4; 184/7.4; 91/1
[58] Field of Search ................... 184/6.21, 6.22, 184/6.23, 6.24, 6.4, 7.4; 91/1, 361

[56] References Cited

U.S. PATENT DOCUMENTS

| | | |
|---|---|---|
| 3,132,775 | 5/1964 | Trumbull et al. . |
| 3,160,331 | 12/1964 | Trumbull et al. . |
| 3,477,545 | 11/1969 | Durnan . |
| 3,633,612 | 1/1972 | Gross . |
| 3,656,140 | 4/1972 | Gruber et al. . |
| 4,105,094 | 8/1978 | Callahan . |
| 4,157,132 | 6/1979 | Kramer ................................... 184/7.4 |
| 4,520,902 | 6/1985 | Snow . |
| 4,648,486 | 3/1987 | Kayser et al. .......................... 184/15.1 |
| 4,858,645 | 8/1989 | Reeves . |
| 4,911,267 | 3/1990 | Matsuda et al. ............................ 184/6 |
| 4,951,785 | 8/1990 | Javelly et al. . |
| 4,993,516 | 2/1991 | Taiani . |
| 5,038,893 | 8/1991 | Willner et al. ........................... 184/7.4 |
| 5,041,990 | 8/1991 | Yabumoto et al. . |
| 5,086,877 | 2/1992 | Synatschke et al. ...................... 184/7.4 |
| 5,141,295 | 8/1992 | Burgdorf et al. ........................ 91/1 X |
| 5,285,871 | 2/1994 | Sievenpiper . |
| 5,758,758 | 6/1998 | Friedrich .......................... 192/30 W X |
| 5,856,745 | 1/1999 | Morgan et al. ........................... 91/1 X |
| 5,902,211 | 5/1999 | Jones et al. ....................... 192/30 W X |

*Primary Examiner*—David A. Bucci
*Assistant Examiner*—Brandon C. Stallman
*Attorney, Agent, or Firm*—Price, Heneveld, Cooper, DeWitt & Litton

[57] ABSTRACT

A device for detecting undesired amounts of gas in a lubricant dispensing system includes a measuring chamber connected to a lubricant dispensing system and configured to receive lubricant therefrom, a moveable rod located at least partially inside the measuring chamber, an actuator operably connected to the measuring chamber and adapted to create at least a partial vacuum in the measuring chamber as the measuring chamber fills with lubricant, and a sensor for detecting a rate of compression or expansion indicative of undesired levels of gas in the lubricant by sensing movement of the moveable rod when the lubricant enters the measuring chamber. The device is constructed to dump charges of lubricant having unacceptable levels of entrapped air, and further includes an adjustment mechanism permitting adjustment without unnecessarily dumping lubricant in the measuring chamber.

35 Claims, 4 Drawing Sheets

APPARATUS FOR DISPENSING MEASURED QUANTITIES OF LUBRICANT

BACKGROUND OF THE INVENTION

The present invention relates to lubricant dispensing systems, and more particularly to lubricant dispensing systems that detect gas in a lubricant.

Excess air entrapped in grease can cause an improper amount of grease to be deposited onto production parts or in other lubricant dispensing applications. This is normally caused by incorrect grease handling, changing of the original grease container, or improper pump priming. The trapped air in grease is compressed to a relatively small volume by the grease supply pressure, which can be as high as 3000 p.s.i., but the air expands to its normal size as the grease is discharged onto the production part. The decompression of the air results in reduced amounts of grease on the production part where the grease should have been. Prior to the present invention, there was no known accurate method by which to detect and dispose of grease including unacceptable amounts of entrapped air. This problem is particularly troublesome where the charges of grease being deposited are relatively small. The lack of such an accurate method has resulted in many "faults" on parts as far as grease volume dispersion.

U.S. Pat. No. 4,993,516 to Taiani discloses an apparatus including a piston that separates a lubricant chamber and a gas chamber. If there is gas in the lubricant, the piston is moved and a relief valve is opened to allow the gas to escape through the piston and gas chamber. However, the Taiani invention does not provide an accurate way to detect a specific untolerable amount of entrapped air in the lubricant, nor does the device of Taiani provide for means to dump the charge of lubricant when the charge has the undesired amount of entrapped gas.

Other patents such as U.S. Pat. No. 3,633,612 to Gross and U.S. Pat. No. 4,520,902 to Snow teach sensing means for measuring pressure differential in a lubricant, but do not offer means for sensing undesired amounts of air in a lubricant.

Accordingly, there is a need in industry for a device that will sense undesired amounts of air in a charge of grease, and dump the charge if it contains an untolerable or undesirable amount of air. Furthermore, there is a desire in industry to be able to easily adjust the size of the charge once it is in the device that measures excess air, without discharging any of the grease first.

SUMMARY OF THE INVENTION

One aspect of the present invention is an apparatus for detecting undesired amounts of gas in lubricant in a lubricant dispensing system comprising a measuring chamber adapted for connection to a lubricant dispensing system and configured to receive lubricant therefrom, a moveable rod located at least partially inside the measuring chamber, a device operably connected to the measuring chamber and configured to create a change in pressure on the lubricant in the measuring chamber, and a sensor configured to sense movement of the rod indicative of undesired levels of gas in the lubricant.

Another aspect of the present invention is an apparatus for measuring undesired levels of gas in a lubricant comprising a measuring chamber adapted for connection to a lubricant dispensing system and configured to receive lubricant therefrom, a moveable rod located at least partially inside the measuring chamber, an actuator operably connected to the measuring chamber and constructed to create a change in pressure on the lubricant in the measuring chamber, a sensor configured to detect unacceptable rates of movement of the rod due to an undesirable level of gas being present in the charge of lubricant by measuring the movement of the moveable rod when the charge of lubricant is undergoing the change in pressure, a discharge valve connected to the measuring chamber by a lubricant line, and a discharge valve controller configured to open the discharge valve when the sensor detects an unacceptable compression rate in the charge of lubricant to thus dispose of the charge.

Still another aspect of the present invention is a lubricating system comprising a pressurized lubricant supply, a measuring chamber configured to receive lubricant from the pressurized lubricant supply, and a sensor detecting a rate of compression or expansion of the lubricant indicative of undesired levels of gas in the lubricant by sensing the rate of expansion or compression of the lubricant in the measuring chamber.

Yet another aspect of the present invention is an apparatus for detecting undesired amounts of air in lubricant in a lubricant dispensing system comprising a measuring chamber adapted for connection to a lubricant dispensing system and configured to receive a charge of lubricant therefrom, a moveable rod located at least partially inside the measuring chamber, a device operably connected to the measuring chamber and constructed to create a change in pressure in the measuring chamber on the charge of lubricant, a sensor for detecting undesired levels of air in the charge of lubricant in the measuring chamber, the sensor sensing movement of the moveable rod in response to the change in pressure causing an unacceptable change in volume of the discharge of lubricant indicative of excess internal air, a valve located downstream from the measuring chamber, a valve controller constructed to close the valve when the sensor senses an acceptable level of internal air, thereby allowing the lubricant charge to be dispensed onto a production part, and constructed to open the valve to allow the lubricant charge to be discarded when the sensor senses an unacceptable level of air in the lubricant charge, and an adjuster operably connected to the measuring chamber for adjusting the volume of output of lubricant from the measuring chamber.

Yet another aspect of the present invention is a method of detecting undesired amounts of gas in a lubricant comprising the steps of providing a device including a measuring chamber for holding a charge of lubricant, a moveable rod located at least partially inside the measuring chamber, and a sensor for detecting an unacceptable rate of compression or expansion indicative of undesired levels of gas when the charge of lubricant undergoes a change in pressure by measuring the rate of movement of the rod; accumulating lubricant in the measuring chamber to create a charge of lubricant; determining the rate of compression or expansion of the charge of lubricant to determine if an undesirable amount of gas is present in the charge of lubricant; and selectively dumping the charge of lubricant if there is an undesired amount of gas in the charge and discharging the charge of lubricant for use if there is an acceptably limited amount of gas in the charge of lubricant.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
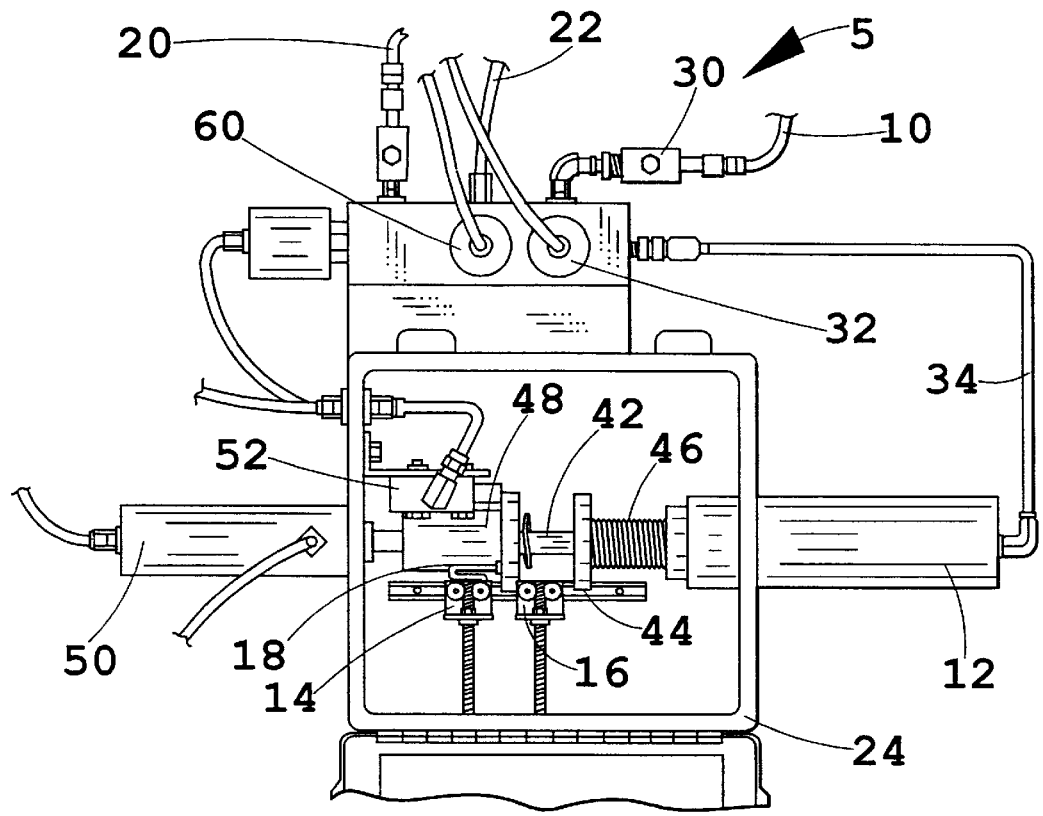
FIG. 1 is a plan view of a device for measuring undesired amounts of gas in a lubricant according to the present invention.

The grease measuring system (FIG. 1) of the present invention generally includes a lubricant dispensing system 5, a grease inlet 10, a measuring chamber 12, sensors 14, 16, and 18 connected by wires 14', 16', and 18' to programmable controller PLC, a grease dump line 20, a grease discharge line 22, and a housing 24.

Grease inlet 10 is a standard grease line from a central pump (not shown), with grease pressures preferably being between about 800 p.s.i. and about 2500 p.s.i. However, the grease line pressure may be as high as 3000 p.s.i. Located on grease inlet 10 is a restrictor 30, which is needed to slow grease flow as it travels from the grease supply into the measuring chamber 12. The restrictor 30 allows the present system to temporarily draw a partial vacuum in the measuring chamber, which results in detectable increased rates of expansion if the grease has entrapped air. Grease inlet 10 is connected to a two-way grease inlet valve 32 which opens to allow grease to enter the measuring chamber 12 through grease line 34, which is connected to measuring chamber 12 at one end.

Figure 2:
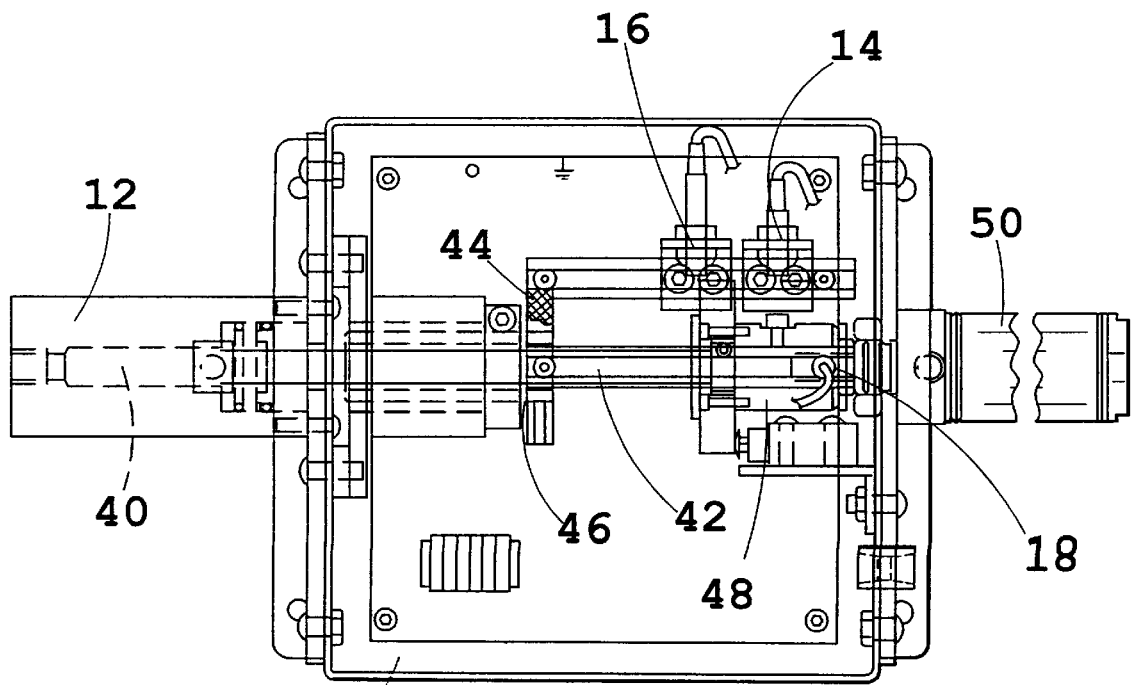
FIG. 2 is a plan view of the measuring system of the device of the present invention.

FIG. 2 shows a more detailed view of the inner workings of the grease measuring system, including measuring chamber 12. Measuring chamber 12 has an adjustable volume chamber 40. In the illustrated system, the measuring chamber can hold from about 0.1 cc to about 4.6 cc of lubricant, although larger or smaller chambers are contemplated. Inside the adjustable volume chamber 40, at the end of the measuring chamber 12 opposite the grease line 34, is a moveable rod 42. The rod 42 is partially inside the adjustable volume chamber 40 and partially outside of it. Moveable rod 42 is preferably about 7/16 ths of an inch in diameter and has a 2-inch stroke inside the adjustable volume chamber 40. The moveable rod 42 is held in place in measuring chamber 12 by sealed O-rings (not shown). An adjustment knob 44 is connected to the measuring chamber 12 at its rod end by a threaded portion 46 which allows the adjustment of the size of lubricant discharge from the measuring chamber 12. The moveable rod 42 is in turn connected to a coupler 48. In operation, as discussed below, coupler 48 triggers one or more of the three sensors of the device.

The first sensor, the "chamber-filled" sensor 14, is triggered when the measuring chamber is filled with a charge of lubricant. The second sensor, the "compressibility proximity" sensor 16, is triggered when an undesirable amount of air is present in the charge of lubricant after the lubricant charge is compressed. The third sensor, a "discharge" sensor 18, is triggered after the device has gone through a compression cycle and results in discharge of the charge of lubricant from the measuring chamber 12. The moveable rod 42 is attached to an air cylinder 50, which houses the majority of the moveable rod 42 (see FIG. 3). The air cylinder 50, in conjunction with the moveable rod 42 and restrictor 30, allows a partial vacuum to be applied to the measuring chamber 12 as it is being filled with lubricant and further allows discharge of the lubricant from the measuring chamber 12 when the compression test is complete. An air logic valve 52 is positioned adjacent to the coupler 48 to ensure that if air is present in the lubricant charge, the inlet will be shut off. If such a valve is not present, the air entrapped in a lubricant will get recompressed, which is undesirable.

The present invention apparatus also includes a discharge valve 60 which is connected to the grease line 34, to the grease dump 20, and to the grease discharge line 22. The discharge valve 60, as discussed below, is opened to allow grease to go to the grease dump 20 when the charge contains an undesirable amount of air and opens to allow the grease to be discharged to a nozzle or production part through the grease discharge line 22 when the charge contains an acceptably low amount of air.

Figure 3:
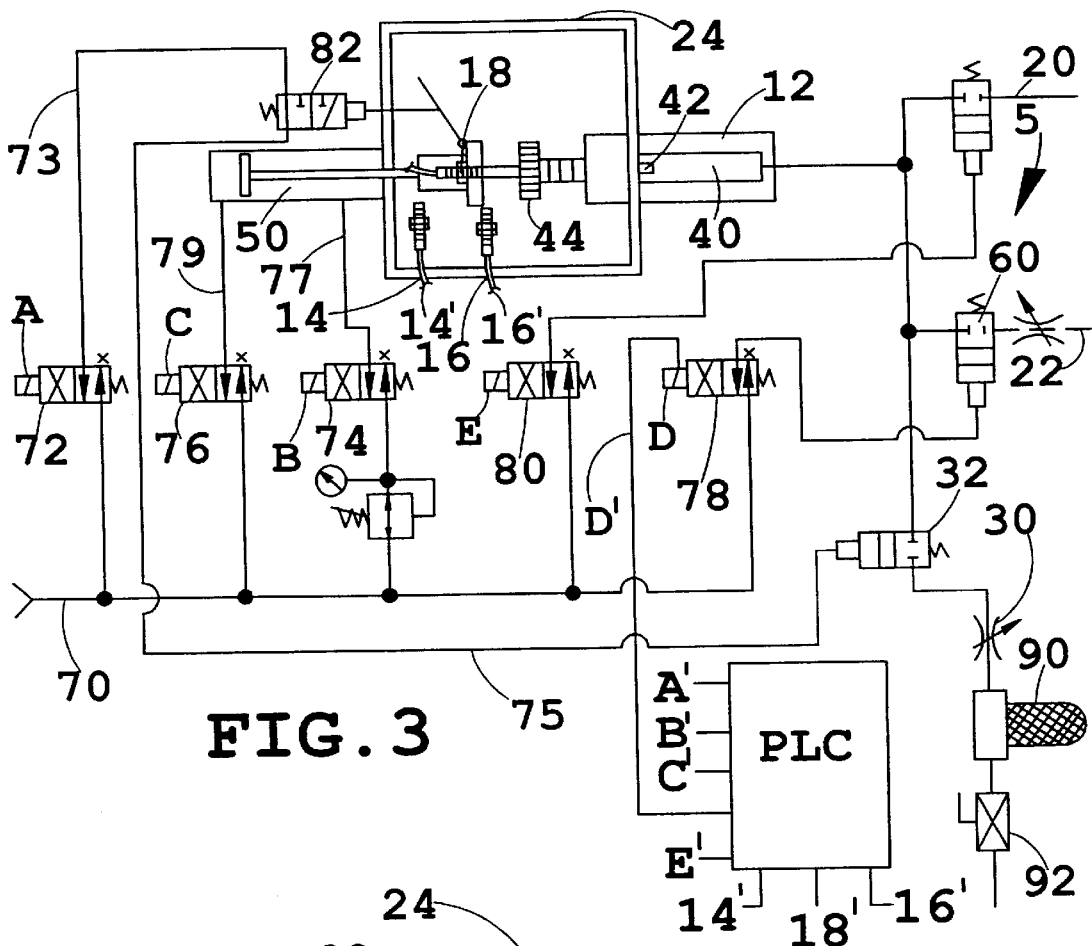
FIG. 3 is a schematic of a lubricant dispensing system according to the present invention with the measuring chamber in the unfilled state.

As shown in FIG. 3, a compressed air line 70 supplies pneumatic pressure to various points of the grease measuring and dispensing system to perform various functions. The compressed air line 70 should preferably be a minimum of 60 p.s.i. to ensure proper functioning of the system. The compressed air line 70 is operably connected individually to pneumatic valves 72, 74, 76, 78, and 80. Each of the valves includes a control solenoid, designated A, B, C, D, and E, attached by wires, A', B', C', D' and E', respectively, to controller PLC. Solenoid A via an air line 73 is connected to valve 82, which in turn is connected to two-way valve 32 via an air line 75. Solenoid B is connected to the air cylinder 56 via an air line 77, and solenoid C 76 is connected to the air cylinder 56 via an air line 79. Solenoid D 78 is connected to valve 60 which is connected to the grease discharge line 22 and grease dump 20. A programmable logic controller (PLC) (not shown) is used to control the activation and deactivation of the solenoids.

Other optional components of the grease measuring and dispensing system are a strainer 90 (FIGS. 3–5) on the grease inlet 10 and a ball shutoff valve 92 on the grease inlet 10 upstream from the restrictor 30 and the strainer 90 to shut off the flow of lubricant to the system.

Operation

In operation, solenoid B 74 is energized to cause pneumatic pressure to be applied to the end air cylinder 50. This pressure will be enough to balance the friction of the seals of the air cylinder 50 and the measuring chamber 12, and also to pull at least a partial vacuum in the measuring chamber 12 as lubricant enters the measuring chamber. Solenoid A is then energized to activate valve A and supply pneumatic pressure to the actuating port of the two-way grease inlet valve 32. This allows a lubricant, such as grease, to flow from the grease inlet 10, through the two-way grease inlet valve 32, through the grease line 34, and to the measuring chamber 12 until adjustable volume chamber 40 is filled. As the adjustable volume chamber 40 fills, the moveable rod 42 is moved in the direction of the rod end of measuring chamber 12. The vacuum previously applied to the measuring chamber 12 will enlarge any air bubbles in the grease, due to the action of restrictor 30, making the filled sensor 14 operate sooner than it would have if there were no air in the grease.

Figure 4:
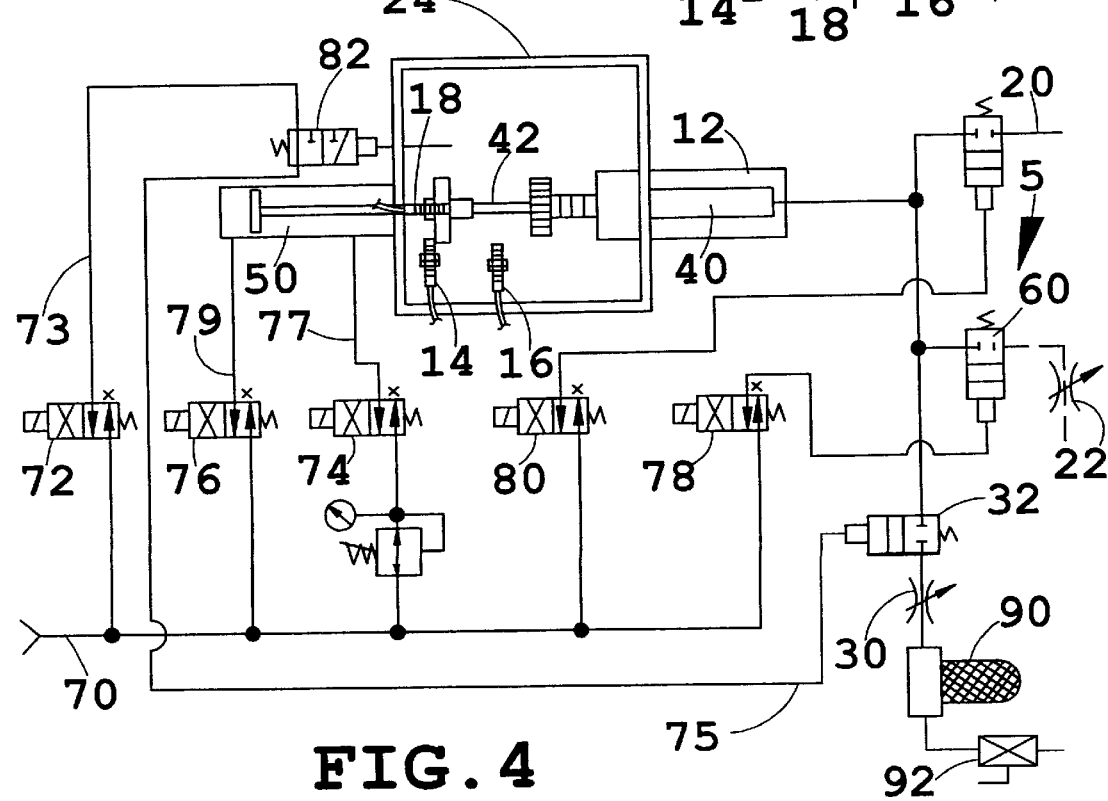
FIG. 4 is a schematic of a lubricant dispensing system according to the present invention with the measuring chamber in the filled state.

FIG. 4 shows the system in the filled position, that is, when the adjustable volume chamber 40 is filled with lubricant. At this point, the filled sensor 14 is actuated by coupler 48, which is positioned by moveable rod 42 moving in the direction of the rod end of measuring chamber 12 when the chamber is filled with lubricant, causing the grease inlet valve 32 to close. The filled sensor 14 will send an output signal to the user's PLC, indicating that the fill operation is complete. Air logic valve 52 ensures that the inlet shuts off when the coupler reaches the position of filled sensor 14. The timing of this action is critical because continuing the grease input after the mechanism indicates that it is filled will compress the air in the grease, making it impossible for the air to be compressed by the 12:1 boost ratio of the moveable rod 42 to cause the movement necessary to recognize the presence of air.

Figure 5:
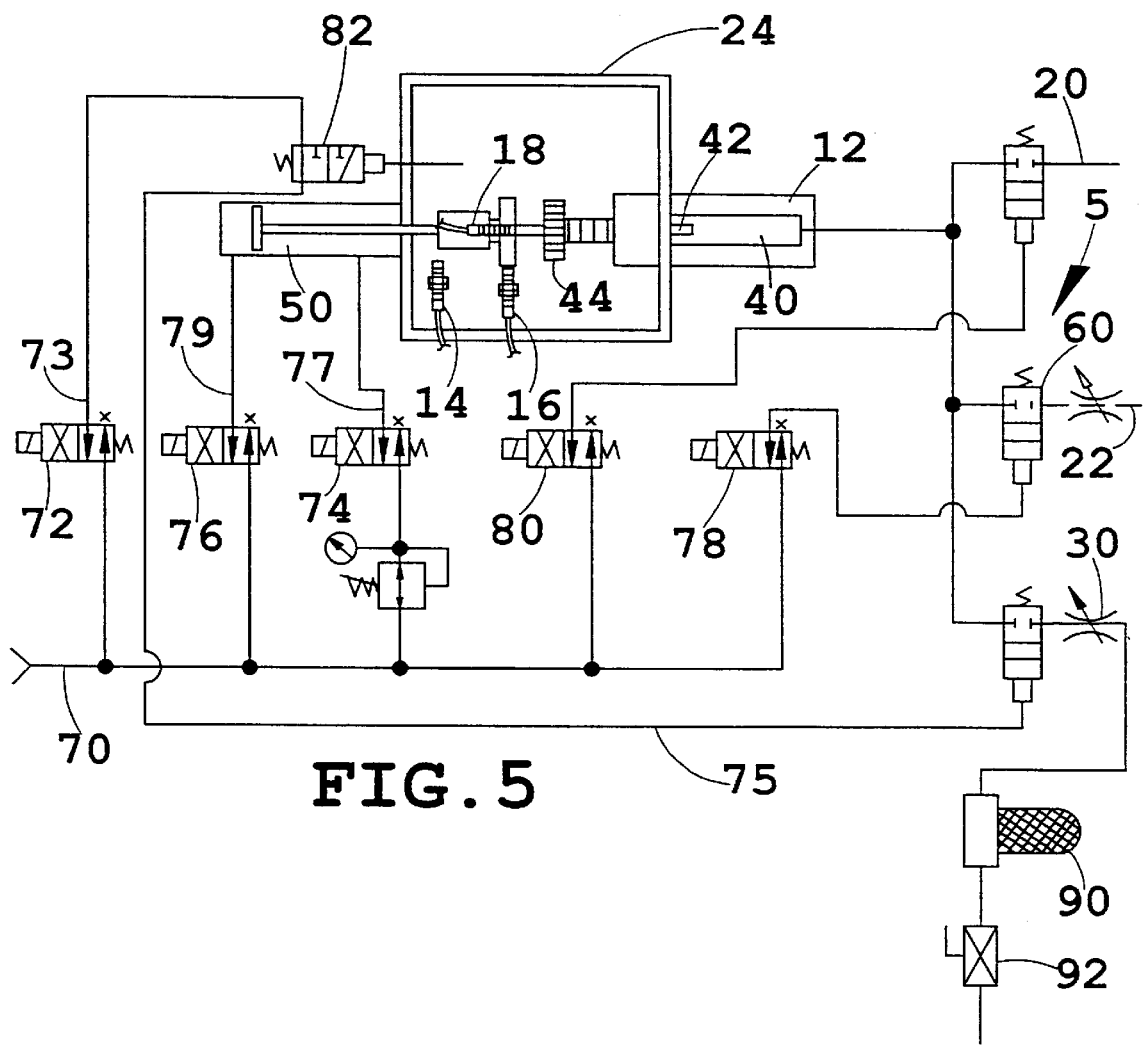
FIG. 5 is a schematic of a lubricant dispensing system of a present invention with the measuring chamber in the compressed state.

Solenoid A of valve 72 and solenoid B of valve 74 is then deactivated by the user's PLC, and solenoid C of valve 76 is also activated, causing the air cylinder 50 to actuate the moveable rod 42, pressurizing the material in the measuring chamber 12. If the measuring chamber 12 has been filled with compressible materials such as a combination of grease and air, and if that compressible air is more than the allowable amount, the moveable rod 42 will quickly move and coupler 48 will actuate the compressibility proximity sensor 16 as shown in FIG. 5. The location of the compressibility sensor 16 can be adjusted by the user to meet the grease-to-air tolerance limits desired by the user. If after about a half a second, the moveable rod 42 does not move far enough to actuate the compressibility sensor 16, the system has detected that the measuring chamber 12 has been filled with a charge of lubricant that does not contain a nontolerable amount of air and this grease can then be dispensed into the proper output device in the lubricant dispensing system 5, which is usually either a nozzle or a production part. The compressibility sensor 16 could also possibly be a linear digital encoder and the PLC could use the "count" for a math equation to measure the movement as a percentage of the amount of grease to be dispensed.

If the charge is a "good" charge, that is, it does not contain an undesirable amount of air, solenoid C 76 is left energized to pressurize the material in the chamber, while solenoid D 78 is energized to supply air pressure to the actuating part of the normally closed dispense valve 60. This action will immediately allow the contents of the measuring chamber 12 to be dispensed back to the lubricant dispensing system 5 and through grease discharge line 22. The discharge sensor 18 will then be actuated. The customer's PLC should be programmed to monitor the dispense time to confirm that the dispensed charge is within the desired limits.

If the lubricant charge is "out of tolerance", that is, it contains an undesirable amount of air, the grease should not be used and should be discarded. To dump the grease, valve 60 is opened and solenoid E of valve 80 causes the material to be pressurized in the measuring chamber 12. This will immediately cause the contents of the measuring chamber 12 to be dumped through grease dump line 20 and the discharge sensor 18 to be actuated to indicate that the dump has been completed. The dump valve can be manually operated or air pilot operated to allow the customer's PLC to automatically dump the charge of lubricant.

Once discharge sensor 18 is activated, the system resets itself and is ready for another measuring cycle. The system will then go through process as described above for as many charges of grease as desired. Furthermore, if the compression test fails, the unit will default to the fail mode and then reset itself. Any type of sensor may be used for the filled 14, compressibility 16, and discharge 18 sensors. Examples of such sensors are mechanical, encoder, laser and optical sensors.

Another unique feature of the present invention is that the volume of discharge out of the measuring chamber 12 can be manually adjusted by using adjustment knob 44 even when the measuring chamber 12 is filled with a charge. The size of the charge can be adjusted by manually turning the adjustment knob 44 or by means of automatically adjusting the output by using a servo motor. There is no loss of grease while making such an adjustment and no grease has to be discharged from measuring chamber 12 for the adjustment to be made.

Figure 6:
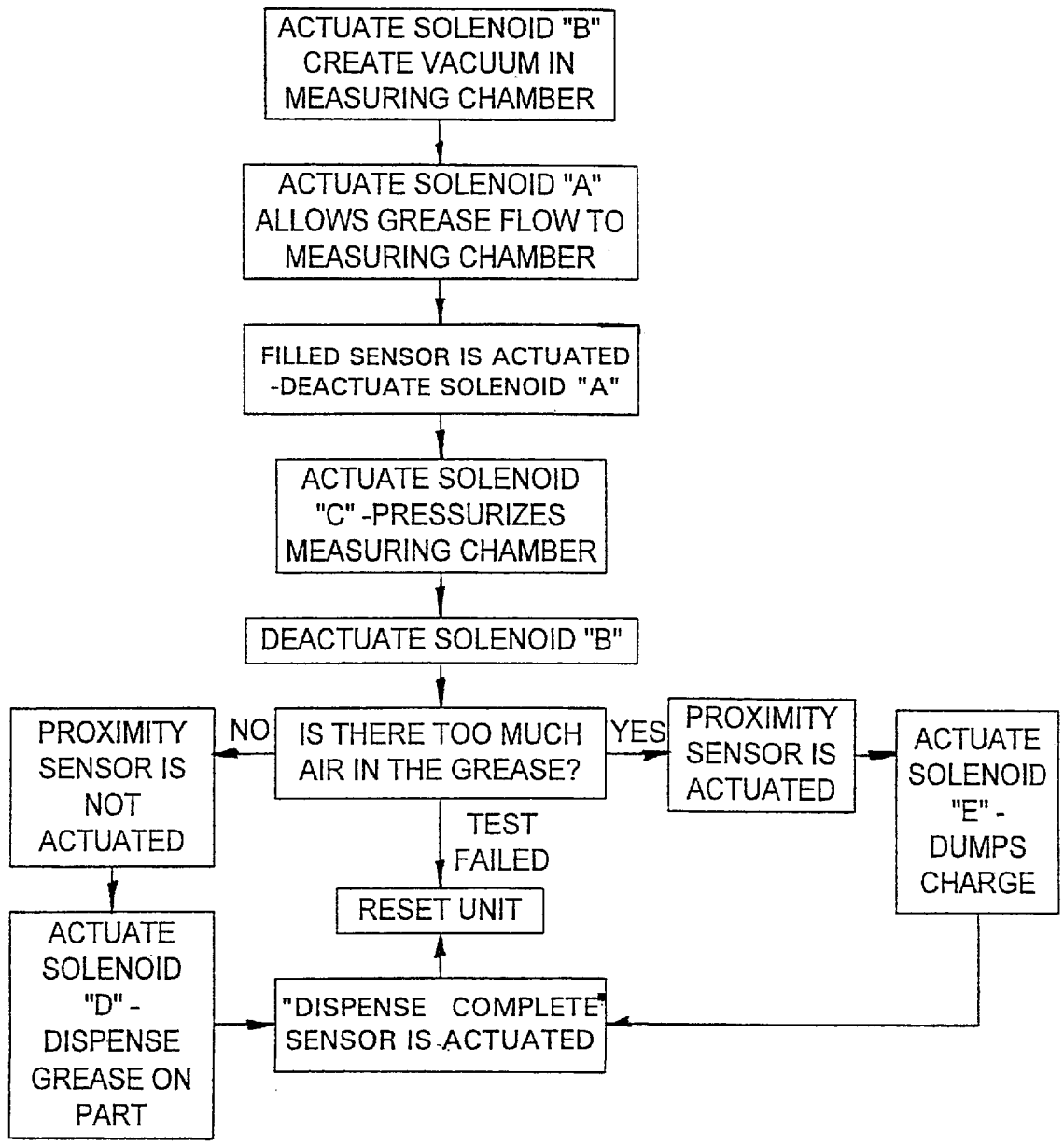
FIG. 6 is a logic diagram of the steps of the gas compressibility test of the present invention.

The above-noted sequence of steps is presented in sequential form diagrammatically in FIG. 6. FIG. 6 shows the logic employed during the compressibility test of the present invention from the beginning of the test to the reset of the system. It is contemplated that either the compressibility or the expandability of lubricant can be measured since entrapped air affects both. Accordingly, it is contemplated that the present invention includes measuring either expansion or compression of lubricant during a pressure change, and dumping the charge of lubricant if too much entrapped air is found therein.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. An apparatus for detecting undesired amounts of gas in lubricant in a lubricant dispensing system comprising:
    a measuring chamber adapted for connection to a lubricant dispensing system and configured to receive lubricant therefrom;
    a moveable rod located at least partially inside the measuring chamber;
    a device connected to the measuring chamber and configured to create a change in pressure on the lubricant in the measuring chamber;
    a valve in communication with the moveable rod, the valve configured to cause an inlet valve to close; and
    a sensor configured to sense movement of the rod indicative of undesired levels of gas in the lubricant.

2. The apparatus defined in claim 1 wherein the device creates a partial vacuum in the measuring chamber.

3. The apparatus defined in claim 1 wherein the device includes an actuator.

4. The apparatus defined in claim 3 wherein the actuator is operably connected to a programmable logic controller.

5. The apparatus defined in claim 4 wherein the actuator includes a pneumatic cylinder connected to the rod for compressing the lubricant and for transporting the lubricant out of the measuring chamber.

6. The apparatus defined in claim 5 wherein the measuring chamber has a volume of about 0.1 cc to about 4.6 cc.

7. The apparatus defined in claim 6 including lubricant in the measuring chamber at a pressure of between about 800 p.s.i. and about 2500 p.s.i.

8. The apparatus defined in claim 1 wherein the measuring chamber has a volume of about 0.1 cc to about 4.6 cc of lubricant.

9. The apparatus defined in claim 1 including a lubricant supply line filled with pressurized lubricant, and wherein when the lubricant is in the measuring chamber, the pressurized lubricant is at a lower pressure than the pressurized lubricant.

10. The apparatus defined in claim 1 including a pneumatic device attached to the rod for motivating the lubricant back into the lubricant dispensing system.

11. The apparatus defined in claim 1 including a discharger connected to the measuring chamber and configured to discharge any lubricant having an unacceptable amount of gas therein.

12. The apparatus defined in claim 1 wherein the lubricant is grease.

13. An apparatus for measuring undesired levels of gas in a lubricant
   a measuring chamber adapted for connection to a lubricant dispensing and configured to receive a charge of lubricant therefrom;
   a moveable rod located at least partially inside the measuring chamber;
   an actuator operably connected to the measuring chamber and constructed to create a change in pressure on the charge of lubricant in the measuring chamber;
   a sensor configured to detect unacceptable rates of movement of the rod due to an undesirable level of gas being present in the charge of lubricant by measuring the movement of the moveable rod when the charge of lubricant is undergoing the change in pressure;
   a discharge valve connected to the measuring chamber by a lubricant line; and
   a discharge valve controller configured to open the discharge valve when the sensor detects an unacceptable rate of movement of the rod to thus dispose of the charge.

14. The apparatus defined in claim 13 wherein the actuator is controlled by a programmable logic controller.

15. The apparatus defined in claim 14 wherein the actuator includes a pneumatic cylinder connected to the rod for compressing the charge of lubricant and for transporting the lubricant out of the measuring chamber.

16. The apparatus defined in claim 15 wherein the measuring chamber has a capacity of about 0.1 cc to about 4.6 cc.

17. The apparatus defined in claim 16 including lubricant in the measuring chamber at a pressure of between about 800 p.s.i. and about 2500 p.s.i.

18. The apparatus defined in claim 13 wherein the measuring chamber has an inner volume capacity of from about 0.1 to about 4.6 cc of lubricant.

19. The apparatus defined in claim 13 including a lubricant supply line filled with pressurized lubricant therein, and wherein when the lubricant is in the measuring chamber, the pressurized lubricant is at a lower pressure than the pressurized lubricant.

20. The apparatus defined in claim 13 including a pneumatic device attached to the rod for motivating the lubricant back into the lubricant dispensing system.

21. The apparatus defined in claim 13 including a pneumatic discharger to discharge the lubricant for use upon completion of a compression test of the lubricant.

22. The apparatus defined in claim 13 wherein the lubricant is grease.

23. A lubricating system comprising:
   a pressurized lubricant supply;
   a measuring chamber configured to receive lubricant from the pressurized lubricant supply; and
   a sensor detecting a rate of compression or expansion of the lubricant indicative of undesired levels of gas in the lubricant by sensing the rate of compression or expansion of the lubricant in the measuring chamber.

24. A lubricating system defined in claim 23 including an adjusting means operably connected to the measuring chamber for adjusting a volume output of the measuring chamber without discharging any lubricant from the measuring chamber even when the measuring chamber contains a full charge of lubricant.

25. The lubricating system of claim 24 including an actuator which is controlled by a programmable logic controller.

26. The lubricating system of claim 25 wherein the actuator includes a pneumatic cylinder connected to a rod for compressing the charge of lubricant and for transporting the lubricant out of the measuring chamber.

27. The lubricating system of claim 26 wherein the measuring chamber has a capacity of about 0.1 cc to about 4.6 cc.

28. The lubricating system of claim 27 including lubricant in the measuring chamber at a pressure of between about 800 p.s.i. and about 2500 p.s.i.

29. The lubricating system of claim 23 wherein the measuring chamber has an inner volume capacity of from about 0.1 cc to about 4.6 cc of lubricant.

30. The lubricating system of claim 23 wherein the lubricant in the measuring chamber is at a lower pressure than the pressurized lubricant.

31. The lubricating system of claim 23 including a pneumatic device attached to a rod for motivating the lubricant back into the lubricant dispensing system.

32. The lubricating system of claim 23, including a pneumatic discharger to discharge the lubricant for use upon completion of a compression test of the lubricant.

33. The lubricating system of claim 23 including a line connecting the pressurized lubricant supply and the measuring chamber, the line restricting flow of the lubricant into the measuring chamber sufficiently to allow a pressure drop in the lubricant sufficient to cause a detectible amount of expansion of entrapped air.

34. An apparatus for detecting undesired amounts of air in lubricant in a lubricant dispensing system comprising:
   a measuring chamber adapted for connection to a lubricant dispensing system and configured to receive a charge of lubricant therefrom;
   a moveable rod located at least partially inside the measuring chamber;
   a device operably connected to the measuring chamber and constructed to create a change in pressure in the measuring chamber on the charge of lubricant;
   a sensor for detecting undesired levels of air in the charge of lubricant in the measuring chamber, the sensor sensing movement of the moveable rod in response to the change in pressure causing an unacceptable change in volume of the charge of lubricant indicative of excess internal air;
   a valve located downstream from the measuring chamber;
   a valve controller constructed to close the valve when the sensor senses an acceptable level of internal air, thereby allowing the lubricant charge to be dispensed onto a production part, and constructed to open the valve to allow the lubricant charge to be discarded when the sensor senses an unacceptable level of air in the lubricant charge; and
   an adjuster operably connected to the measuring chamber for adjusting the volume of output of lubricant from the measuring chamber.

35. A method of detecting undesired amounts of gas in a lubricant comprising the steps of:

providing a device including a measuring chamber for holding a charge of lubricant, a moveable rod located at least partially inside the measuring chamber, and a sensor connected to the rod for detecting an unacceptable rate of compression or expansion indicative of undesired levels of gas when the charge of lubricant undergoes a change in pressure by measuring the rate of movement of the rod;

accumulating lubricant in the measuring chamber to create a charge of lubricant;

determining the rate of compression or expansion of the charge of lubricant to determine if an undesirable amount of gas is present in the charge of lubricant; and selectively dumping the charge of lubricant if there is an undesired amount of gas in the charge and discharging the charge of lubricant for use if there is an acceptably limited amount of gas in the charge of lubricant.

* * * * *

UNITED STATES PATENT AND TRADEMARK OFFICE
CERTIFICATE OF CORRECTION

PATENT NO. : 6,053,285
DATED : April 25, 2000
INVENTOR(S) : Gordon P. Reeves

It is certified that error appears in the above-identified patent and that said Letters Patent is hereby corrected as shown below:

Column 7, claim 13, line 11;
    After "lubricant" insert --comprising:--.

Column 7, claim 13, line 13;
    After "dispensing" insert --system--.

Signed and Sealed this

Twenty-seventh Day of March, 2001

*Attest:*

NICHOLAS P. GODICI

*Attesting Officer*    *Acting Director of the United States Patent and Trademark Office*